(12) United States Patent
Byun

(10) Patent No.: US 10,908,836 B2
(45) Date of Patent: Feb. 2, 2021

(54) MEMORY SYSTEM AND OPERATION METHOD THEREOF

(71) Applicant: Sk hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/597,287

(22) Filed: Oct. 9, 2019

(65) Prior Publication Data

US 2020/0183608 A1 Jun. 11, 2020

(30) Foreign Application Priority Data

Dec. 11, 2018 (KR) .................. 10-2018-0158833

(51) Int. Cl.
*G06F 3/06* (2006.01)
(52) U.S. Cl.
CPC ............ *G06F 3/0652* (2013.01); *G06F 3/064* (2013.01); *G06F 3/0611* (2013.01); *G06F 3/0631* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 8,074,021 B1* | 12/2011 | Miller | ................. | G06F 12/0246 711/114 |
| 8,769,190 B1* | 7/2014 | Syu | ......................... | G06F 3/064 711/103 |
| 10,540,274 B2* | 1/2020 | Szubbocsev | ............ | G06F 3/061 |
| 2012/0110249 A1* | 5/2012 | Jeong | ..................... | G06F 3/0659 711/103 |
| 2013/0132650 A1* | 5/2013 | Choi | ...................... | G06F 3/0679 711/103 |
| 2015/0078086 A1* | 3/2015 | Lee | ........................ | G11C 16/08 365/185.11 |
| 2016/0162215 A1* | 6/2016 | Jayaraman | ............ | G06F 3/0688 711/103 |
| 2016/0283401 A1* | 9/2016 | Virajamangala | .... | G06F 12/0246 |
| 2017/0060768 A1* | 3/2017 | Zhang | ..................... | G06F 3/064 |
| 2018/0075912 A1* | 3/2018 | Shimizu | ................. | G11C 16/30 |

FOREIGN PATENT DOCUMENTS

| | | |
|---|---|---|
| KR | 10-2016-0040693 | 4/2016 |
| KR | 10-2016-0042287 | 4/2016 |

OTHER PUBLICATIONS

Choi et al, Parallelizing Garbage Collection with I/O to Improve Flash Resource Utilization, HPDC '18 Jun. 11-15, 2018 (Year: 2018).*

* cited by examiner

*Primary Examiner* — Ryan Bertram
*Assistant Examiner* — Edmund H Kwong
(74) *Attorney, Agent, or Firm* — IP & T Group LLP

(57) ABSTRACT

A memory system includes a memory device comprising a plurality of planes and a controller suitable for controlling the memory device. The controller may include a processor suitable for determining at least one busy plane and at least one idle plane among the plurality of planes in response to a host command, and controlling the memory device such that the busy plane performs an operation associated with the host command and the idle plane performs an operation of erasing a complete dirty block in the idle plane. The busy plane and the idle plane may operate in parallel in response to control of the processor.

20 Claims, 12 Drawing Sheets

700

|  | Plane1 | Plane2 | Plane3 | Plane4 |
|---|---|---|---|---|
| SuperBlock1 | 1 | 1 | 0 | 0 |
| SuperBlock2 | 0 | 0 | 0 | 0 |
| SuperBlock3 | 0 | 0 | 0 | 0 |
| SuperBlock4 | 1 | 1 | 1 | 1 |
| SuperBlock5 |  |  |  |  |

MEMORY SYSTEM AND OPERATION METHOD THEREOF

CROSS-REFERENCE TO RELATED APPLICATION

This application claims priority under 35 U.S.C. § 119 to Korean Patent Application No. 10-2018-0158833 filed on Dec. 11, 2018, which is incorporated herein by reference in its entirety.

BACKGROUND

1. Field

Exemplary embodiments relate to a memory system, and more particularly, to a memory system including a memory device, and an operation method thereof.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since the memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a memory system capable of improving write performance of a memory device, and an operation method thereof.

In an embodiment, a memory system may include: a memory device comprising a plurality of planes; and a controller suitable for controlling the memory device. The controller may include a processor suitable for determining at least one busy plane and at least one idle plane among the plurality of planes in response to a host command, and controlling the memory device such that the busy plane performs an operation associated with the host command and the idle plane performs an operation of erasing a complete dirty block in the idle plane. The busy plane and the idle plane may operate in parallel in response to control of the processor.

In an embodiment, there is provided an operation method of a memory system which includes a memory device including a plurality of planes. The operation method may include: determining at least one busy plane and at least one idle plane among the plurality of planes in response to a host command; performing, by the busy plane, an operation associated with the host command; and performing, by the idle plane, an erase operation on a complete dirty block. The performing of the operation associate with the host command and the performing of the erase operation on the complete dirty block may be performed in parallel.

In an embodiment, a memory system may include: a memory device including a plurality of planes, which includes a plurality of blocks forming a superblock, each plane including a corresponding block among the plurality of blocks; and a controller suitable for: determining at least one plane associated with a command from a host, among the plurality of planes; and controlling the determined plane and at least one of remaining planes among the plurality of planes such that the determined plane performs an operation corresponding to the command, while the at least one of the remaining planes performs an operation of erasing a complete dirty block therein, the complete dirty block including invalid data.

DETAILED DESCRIPTION

Hereafter, exemplary embodiments of the present invention is will be described with reference to the accompanying drawings. It should be understood that the following descriptions will be focused on portions required for understanding an operation in accordance with an embodiment, and descriptions of the other portions will be ruled out in order not to unnecessarily obscure subject matter of the present disclosure.

Figure 1:
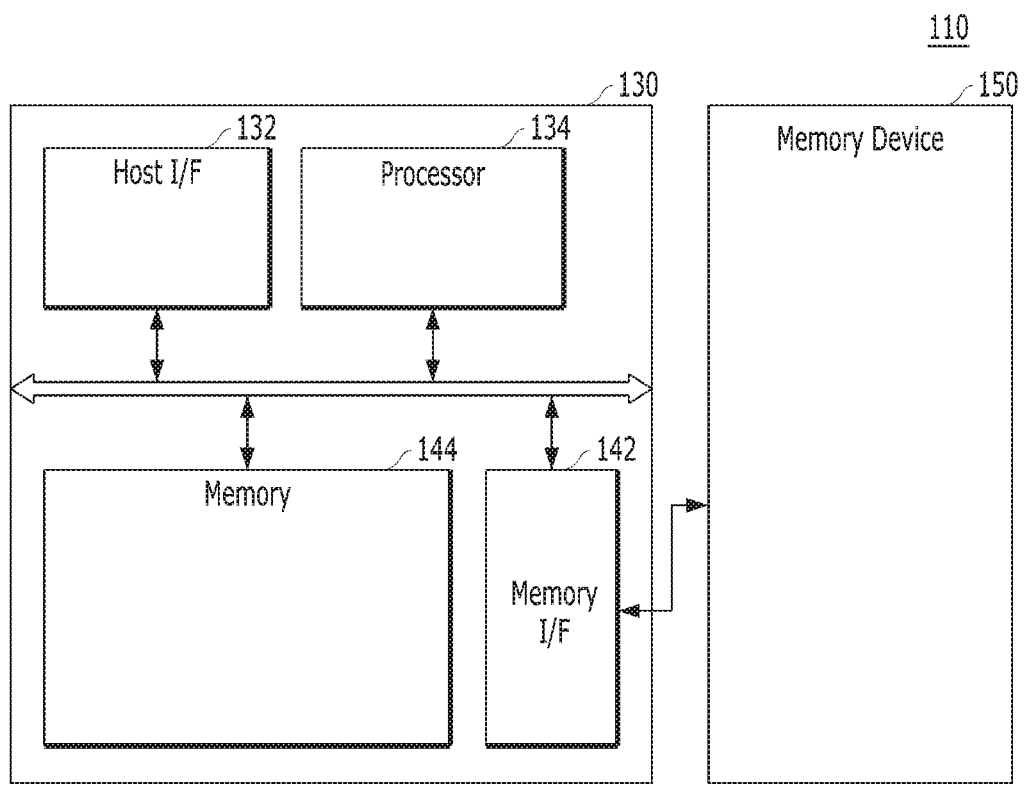
FIG. 1 is a diagram schematically illustrating a structure of a memory system including a controller in accordance with an embodiment.

FIG. 1 is a diagram schematically illustrating a structure of a memory system 110 including a controller 130 in accordance with an embodiment.

Referring to FIG. 1, the memory system 110 may operate in response to a request from a host. In particular, the memory system 110 may store data accessed by the host. That is, the memory system 110 may be used as a main memory device or secondary memory device of the host.

The memory system 110 may operate to store data for a host (not shown) in response to a request from the host. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host through a write operation, and provide data stored therein to the host through a read operation. The memory device 150 may be implemented with a nonvolatile memory device, for example, a flash memory. At this time, the flash memory may have a three-dimensional stack structure.

Each of the memory blocks in the memory device 150 may be configured as any one of a single level cell (SLC) memory block, a multi-level cell (MLC) memory block, a triple level cell (TLC) memory block, a quadruple level cell (QLC) memory block and a multiple level cell memory block capable of storing five or more bits in one memory cell, depending on the number of bits which can be stored in one memory cell.

Hereafter, the configuration in which the memory device 150 is implemented with a nonvolatile memory such as a NAND flash memory will be exemplified for convenience of description. However, the present embodiment is not limited to such a configuration, but the memory device 150 may be implemented with a NOR-type flash memory, a hybrid flash memory in which at least two or more types of memory cells are mixed, or a one-NAND flash memory having a controller embedded in a memory chip. Furthermore, the memory device 150 in accordance with the present embodiment may also be implemented with a flash memory device having a charge storage layer formed of a conductive floating gate or a charge trap flash (CTF) memory device having a charge storage layer formed of a dielectric layer. In addition, the memory device 150 may be implemented with any one of memories such as a phase change random access memory (PCRAM), a resistive random access memory (RRAM or ReRAM), a ferroelectric random access memory (FRAM) and a spin transfer torque magnetic random access memory (STT-RAM or STT-MRAM).

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

More specifically, the controller 130 may include a host interface (I/F) 132, a processor 134, a memory I/F 142 and a memory 144.

The host interface 132 may be configured to process a command and data of the host, and may communicate with the host through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The host interface 132 may be driven through firmware referred to as a host interface layer (HIL) in order to exchange data with the host.

The memory interface 142 may serve as a memory/storage interface for interfacing the controller 130 and the memory device 150 such that the controller 130 controls the memory device 150 in response to a request from the host. When the memory device 150 is a flash memory or specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory interface 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150 when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host through the processor 134. In other words, the controller 130 may perform a command operation corresponding to a command received from the host. The controller 130 may perform a foreground operation as the command operation corresponding to the command received from the host. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation onto the memory device 150 through the processor 134.

Figure 2:
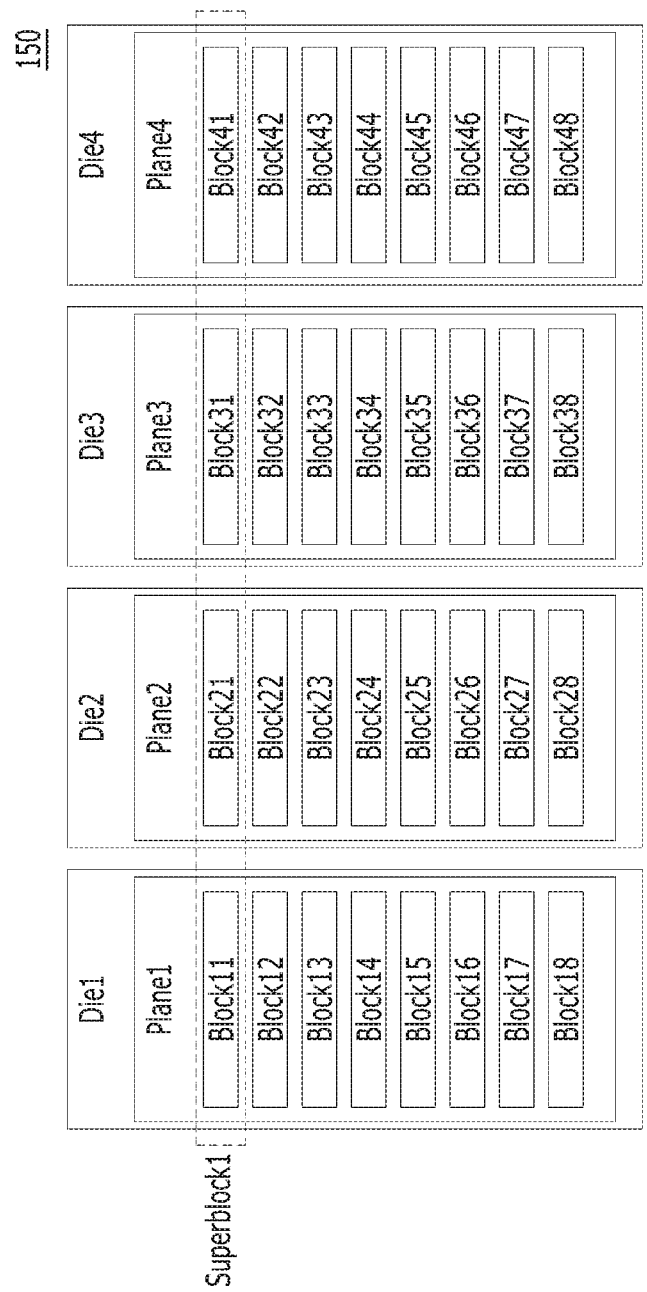
FIG. 2 is a diagram illustrating a plurality of planes included in a memory device.

FIG. 2 illustrates a plurality of planes Plane1 to Plane4 in the memory device 150.

Referring to FIG. 2, the memory device 150 may include one or more memory dies. Each of the dies may include one or more planes. By way of example, FIG. 2 illustrates that each of the dies Die1 to Die4 includes one plane.

Each of the planes Plane1 to Plane4 may include a plurality of memory blocks. Each of the memory blocks Block11 to Block48 may include a plurality of pages (not illustrated), and each of the pages may include a plurality of memory cells (not illustrated) coupled to a word line.

Here, one memory block may correspond to a unit that can be physically erased at once. One page may correspond to a unit that can be written or read at once.

The plurality of planes Plane1 to Plane4 may operate independently of one another. In order to improve the parallel processing performance of the memory system 110, the controller 130 may configure one superblock by logically coupling memory blocks in the respective planes Plane1 to Plane4. FIG. 2 illustrates a first superblock Superblock1 composed of 11th, 21st, 31st and 41st blocks Block11, Block21, Block 31 and Block 41, which are included in the respective planes Plane1 to Plane4.

Figure 3:
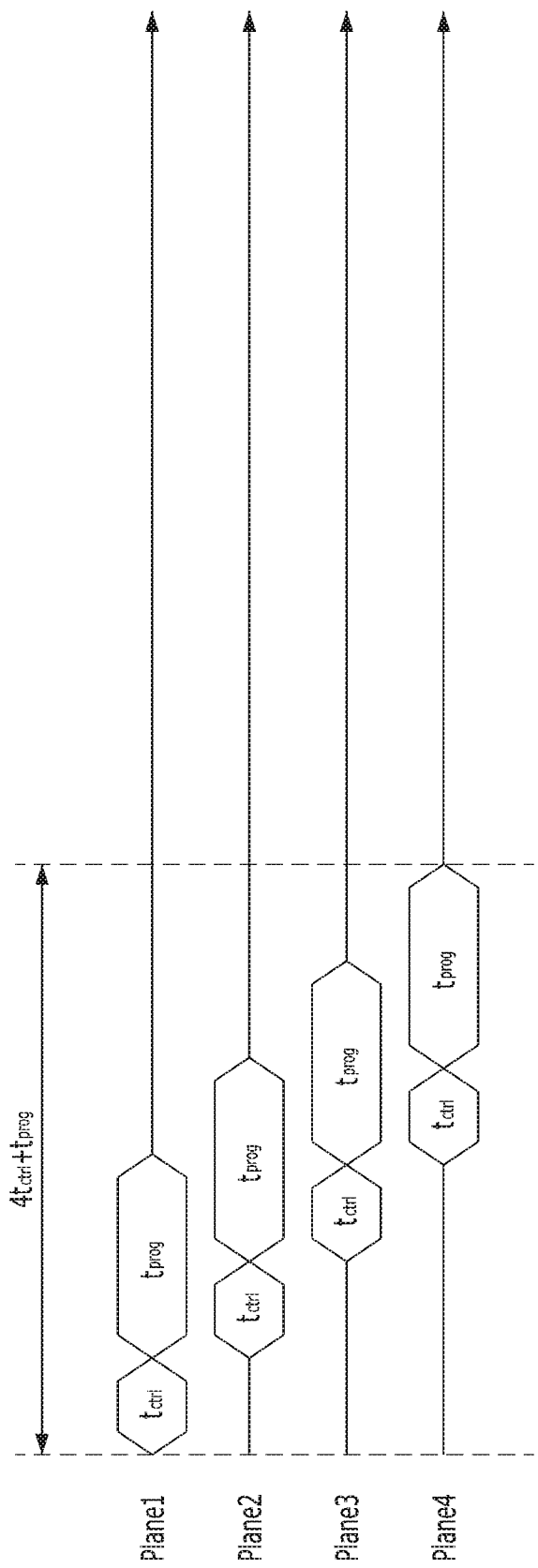
FIG. 3 is a timing diagram illustrating parallel operations of a plurality of planes.

FIG. 3 is a timing diagram illustrating parallel operations of the plurality of planes Plane1 to Plane4.

In FIG. 3, $t_{ctrl}$ represents time required for the memory interface 142 to provide a command to the memory device 150, and $t_{prog}$ represents time required for performing a write operation on one page.

The processor 134 may pair commands for the plurality of planes Plane1 to Plane4 in order to control the parallel operations of the plurality of planes Plane1 to Plane4. The processor 134 may provide the paired commands to the plurality of dies Die1 to Die4 through the memory interface 142. Each of the dies Die1 to Die4 may acquire the paired command and provide the paired command to the internal plane. The plurality of planes Plane1 to Plane4 may perform command operations in parallel in response to the respective paired commands.

Referring to FIG. 3, when the plurality of planes Plane1 to Plane4 perform write operations on four pages in parallel, a time of $(4t_{ctrl}+t_{prog})$ may be required. On the other hand, when one plane performs write operations on four pages, a time of $(4t_{ctrl}+4t_{prog})$ may be required. That is, the controller 130 may access the superblocks in parallel, thereby improving the performance of the memory system 110.

Figure 4:
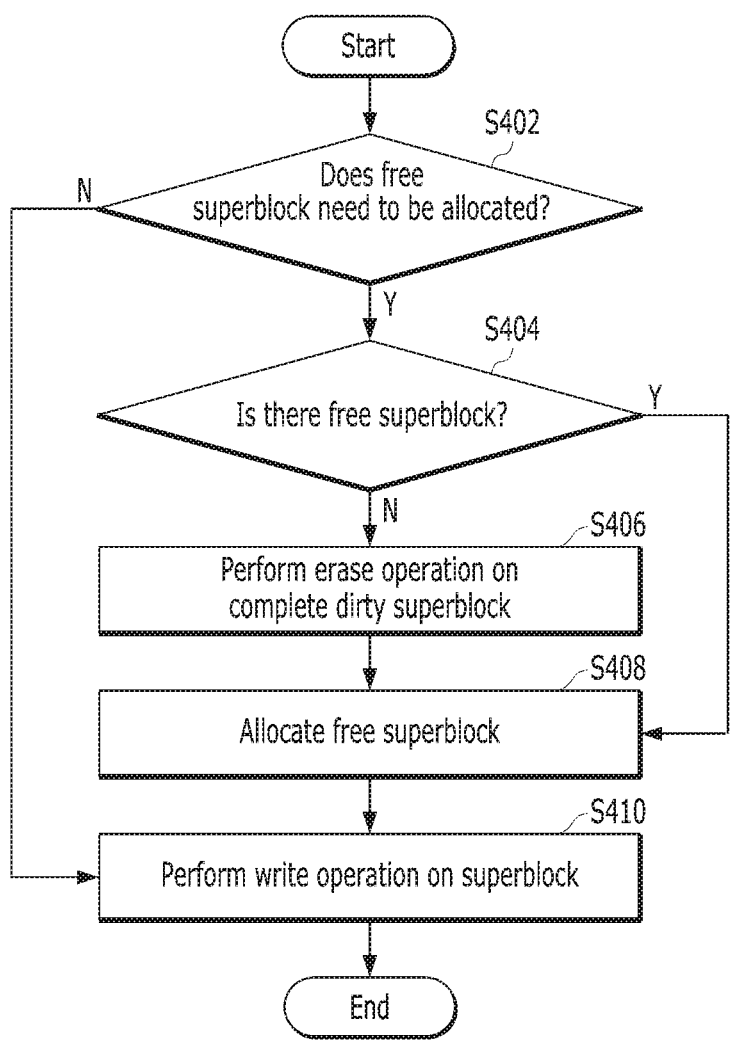
FIG. 4 is a flowchart illustrating a write operation of a memory system including superblocks.

FIG. 4 is a flowchart illustrating a write operation of the memory system 110 including the superblocks.

In this specification, a superblock in an erase state may be defined as a free superblock, and a superblock including data may be defined as a dirty superblock. Among the dirty superblocks, a superblock without valid data, i.e., a superblock including invalid data may be defined as a complete dirty superblock.

Similarly, in this specification, a memory block in an erase state may be defined as a free block, a memory block including data may be defined as a dirty block, and a memory block including invalid data among the dirty blocks may be defined as a complete dirty block.

Referring to FIG. 4, in step S402, the processor 134 of FIG. 1 may determine whether a free superblock needs to be allocated to perform a write operation.

When it is determined that a free superblock does not need to be allocated ("N" in step S402), the processor 134 may perform step S410.

When it is determined that a free superblock needs to be allocated ("Y" in step S402), the processor 134 may determine whether a free superblock is present in the memory device 150, in step S404.

When it is determined that a free superblock is present in the memory device 150 ("Y" in step S404), the processor 134 may perform step S408.

When it is determined that no free superblock is present in the memory device 150 ("N" in step S404), the processor 134 may provide an erase command to the memory device 150 through the memory interface 142 in step S406. The memory device 150 may generate a free superblock by performing an erase operation on a complete dirty superblock in response to the erase command.

In step S408, the processor 134 may allocate a free superblock to perform the write operation.

In step S410, when the processor 134 provides a write command to the memory device 150 through the memory interface 142, the memory device 150 may perform a write operation on the superblock.

When the memory device 150 includes an insufficient number of free superblocks, the erase operation of step S406 may be frequently performed, in order to perform a write operation. That is, when the memory device 150 includes an insufficient number of free superblocks, the write performance of the memory system 110 may be degraded.

Depending on the attribute of a command or the amount of data corresponding to the command, the memory device 150 may not perform parallel operations in all of the planes Plane1 to Plane4. That is, the controller 130 may provide commands to only some dies of the plurality of dies Die1 to Die4, the planes belonging to the some dies among the plurality of planes Plane1 to Plane4 may perform command operations, and the planes belonging to the other dies may be placed in an idle state and not perform command operations. In this specification, a plane that performs a command operation in response to a host command may be defined as a busy plane, and a plane in an idle state may be defined as an idle plane.

In accordance with an embodiment, the controller 130 may control an idle plane to perform an erase operation on a complete dirty block in the idle plane, when a busy plane performs a command operation. When the idle plane performs the erase operation to secure many free blocks, the frequency at which the erase operation of step S406 is performed during the write operation may decrease, which makes it possible to improve the write performance of the memory system 110.

Figure 5:
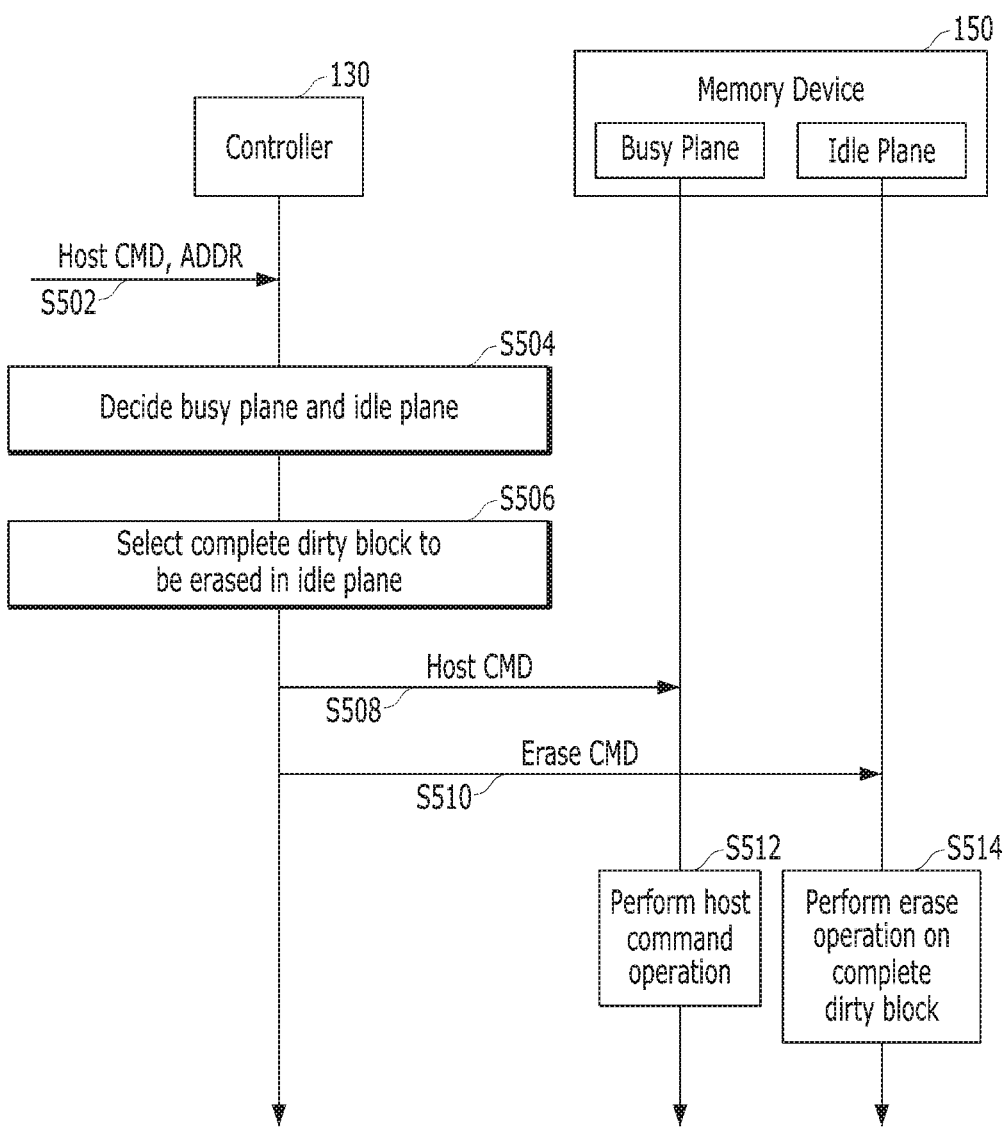
FIGS. 5 and 6 are flowcharts illustrating an operation of a memory system in accordance with an embodiment.

FIG. 5 is a flowchart illustrating an operation of the memory system 110 in accordance with an embodiment.

Referring to FIG. 5, in step S502, the processor 134 of FIG. 1 may acquire a host command CMD and a logical address ADDR through the host interface 132.

In step S504, the processor 134 may determine a busy plane and an idle plane based on the host command.

Specifically, the processor 134 may translate the logical address into a physical address, and thus determine whether to perform a command operation on a memory block belonging to a certain plane. The processor 134 may determine as a busy plane, the plane in which the memory block on which the command operation is to be performed belongs. The processor 134 may determine, as an idle plane, a plane which is not the busy plane among the plurality of planes Plane1 to Plane4.

When the plurality of planes Plane1 to Plane4 are all determined as busy planes, the processor 134 may perform step S508.

In step S506, the processor 134 may select a complete dirty block which is to be erased in the idle plane.

Figure 6:
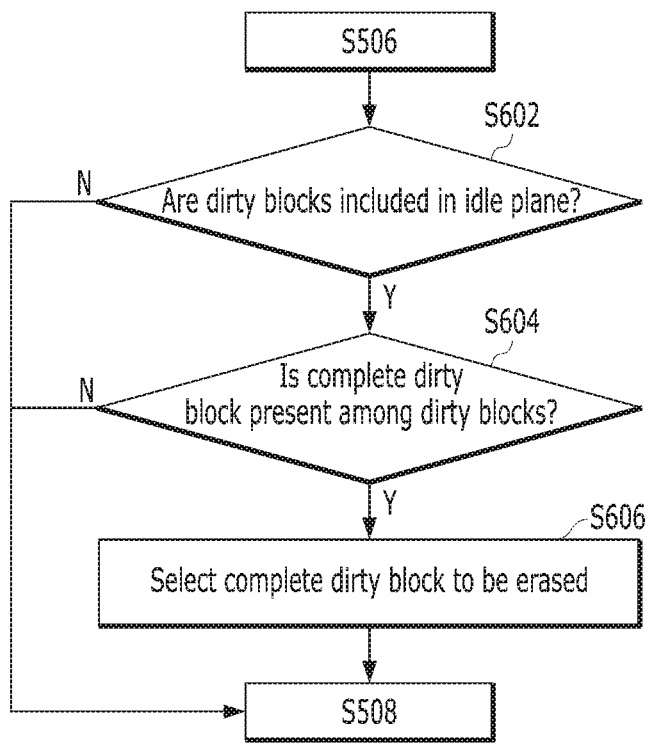

FIG. 6 is a flowchart illustrating the operation of step S506 in detail.

Referring to FIG. 6, step S506 may include steps S602 to S606.

In step S602, the processor 134 may determine whether a dirty block is included in the idle plane.

In an embodiment, the processor 134 may determine whether the dirty block is included, by referring to a superblock table.

Figures 7, 8:
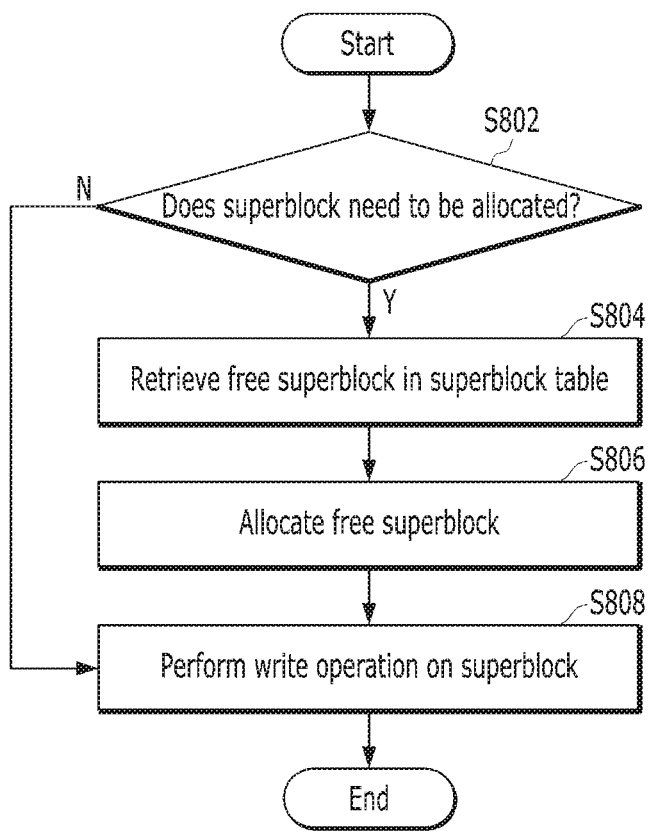
FIG. 7 is a diagram illustrating a superblock table.
FIG. 8 is a flowchart illustrating a write operation in accordance with an embodiment.

FIG. 7 illustrates a superblock table 700.

Referring to FIG. 7, the superblock table 700 may indicate whether each of the memory blocks in the memory device 150 is a free block. The superblock table 700 may be stored in the memory 144 described with reference to FIG. 1.

The superblock table 700 may include the identifiers of superblocks as indexes. Entries for each of the indexes may store bit values using the respective planes as fields.

The bit value for each of the fields may indicate whether a memory block in the corresponding plane among memory blocks constituting a superblock is a free block at the moment. For example, when a memory block in a first plane Plane1 among memory blocks constituting a first superblock SuperBlock1 is a free block, a bit value '1' may be stored in the corresponding entry. For example, when a memory block in a third plane Plane3 among the memory blocks constituting the first superblock SuperBlock1 is a dirty block, a bit value '0' may be stored in the corresponding entry.

Referring back to FIG. 6, the processor 134 may determine whether entries having the bit value '0' stored therein are present among entries corresponding to an idle plane in the superblock table, and thus check whether dirty blocks are included in the idle plane, in step S602.

When no dirty block is present in the idle plane ("N" in step S602), the processor 134 may perform step S508.

When it is determined that dirty blocks are present in the idle plane ("Y" in step S602), the processor 134 may determine whether a complete dirty block is present among the dirty blocks, in step S604.

In an embodiment, the memory 144 may store valid page counts (VPCs) of the respective memory blocks. The processor 134 may determine whether a block of which the VPC is '0' is present among the dirty blocks, and thus determine whether there is a complete dirty block.

When it is determined that no complete dirty block is present in the idle plane ("N" in step S604), the processor 134 may perform step S508.

When it is determined that a complete dirty block is present in the idle plane ("Y" in step S604), the processor 134 may select one or more blocks as complete dirty blocks to be erased in step S606.

In an embodiment, when the idle plane includes a plurality of complete dirty blocks therein, the processor 134 may select any one of the complete dirty blocks as a complete dirty block to be erased, based on a predetermined priority. For example, the predetermined priority may be determined according to the number of erase-write (EW) cycles.

Referring back to FIG. 5, in step S508, the processor 134 may provide a host command to the busy plane through the memory interface 142.

In step S510, the processor 134 may provide an erase command to the idle plane through the memory interface 142.

In step S512, the busy plane may perform a command operation in response to the host command provided from the processor 134.

In step S514, the idle plane may generate a free block by performing an erase operation on the complete dirty block to be erased, in response to the erase command.

Steps S512 and S514 may be performed in parallel. That is, an erase operation time required for generating a free block may overlap a host command operation time, and thus have no influence on degradation in performance of the memory system 110.

In an embodiment, the processor 134 may designate the complete dirty block as a free block in the superblock table 700, when the operation of step S514 is completed. Specifically, the processor 134 may change the bit value of the entry corresponding to the generated free block to '1' in the superblock table 700.

FIG. 8 is a flowchart illustrating a write operation in accordance with an embodiment.

Referring to FIG. 8, in step S802, the processor 134 of FIG. 1 may determine whether a free superblock needs to be allocated to perform a write operation.

When it is determined that a free superblock does not need to be allocated ("N" in step S802), the processor 134 may perform step S808.

When it is determined that a free superblock needs to be allocated ("Y" in step S802), the processor 134 may retrieve a free superblock of the memory device 150 in step S804.

In an embodiment, the processor 134 may determine whether the memory blocks constituting each of the superblocks are all free blocks in the superblock table 700. The processor 134 may retrieve a superblock whose memory blocks are all free blocks, as a free superblock. For example, the processor 134 may retrieve, as a free superblock, a superblock corresponding to an index in which the bit values of all entries are '1'.

In an embodiment, when a plurality of free superblocks are retrieved, the processor 134 may allocate any one of the free superblocks based on a predetermined priority, in order to perform the write operation. For example, the predetermined priority may be determined according to the number of EW cycles.

When no free superblock is retrieved, the processor 134 may generate a free superblock through an erase operation as described in step S406. However, since the processor 134 generates a free block by performing an erase operation when there is an idle plane, the frequency at which a free superblock is not retrieved may decrease.

In step S806, the processor 134 may allocate the retrieved free superblock to perform a write operation.

In an embodiment, the processor 134 may designate the memory blocks constituting the allocated free superblock as dirty blocks in the superblock table 700. For example, the processor 134 may designate the bits of the entries corresponding to the memory blocks constituting the allocated free superblock as '0'.

In step S808, when the processor 134 provides a write command to the memory device 150 through the memory interface 142, the memory device 150 may perform a write operation on the superblock in response to the write command.

In accordance with the present embodiment, the frequency at which the erase operation of step S406 is performed during a write operation may decrease, which makes it possible to improve the write performance of the memory system 110.

Hereafter, referring to FIGS. 9 to 17, a data processing system and electronic devices to which the memory system 110 described with reference to FIGS. 1 to 8 in accordance with the present embodiment and including the memory device 150 and the controller 130 is applied will be described in more detail.

Figure 9:
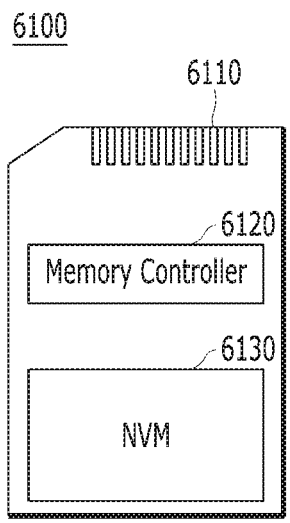
FIGS. 9 to 17 are diagrams schematically illustrating examples of a data processing system including a memory system in accordance with an embodiment.

FIG. 9 is a diagram schematically illustrating the data processing system including the memory system in accordance with an embodiment. For example, FIG. 9 schematically illustrates a memory card system 6100 to which the memory system in accordance with an embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented as a nonvolatile memory. For example, the memory device 6130 may be implemented as any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) and a universal flash storage (UFS).

Figure 10:
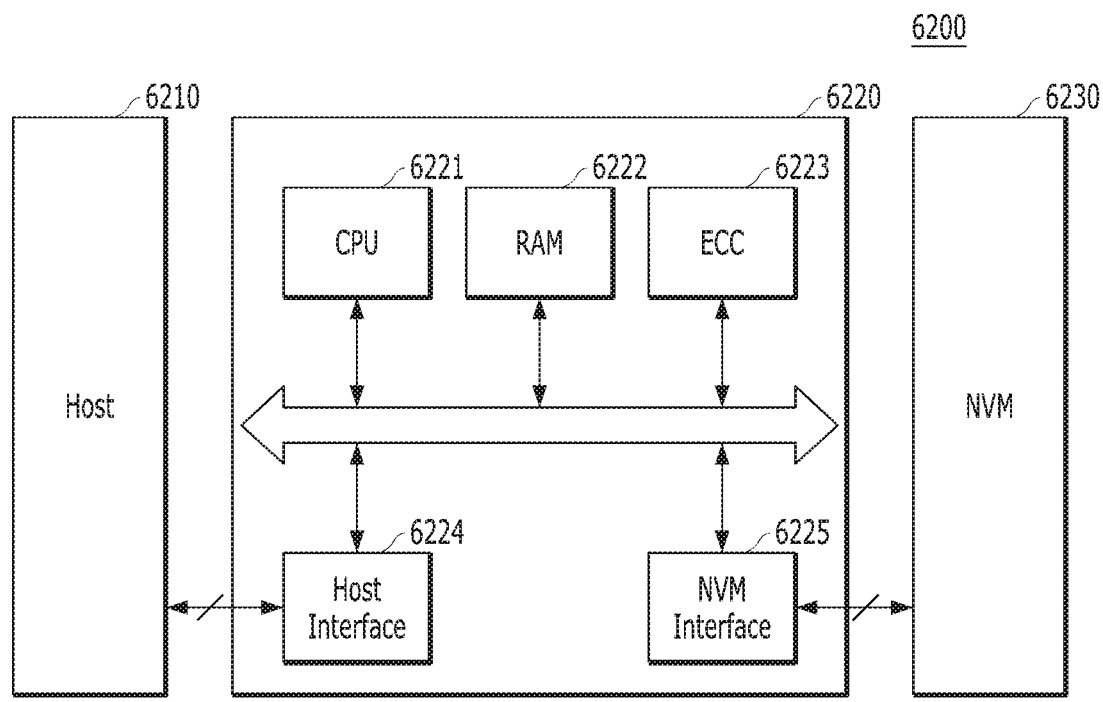

FIG. 10 is a diagram schematically illustrating another example of a data processing system 6200 including the memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 may serve as a storage medium such as a memory card (e.g., CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit and/or receive data to and/or from the host 6210 through the host interface 6224, and transmit/receive data to/from the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 11:
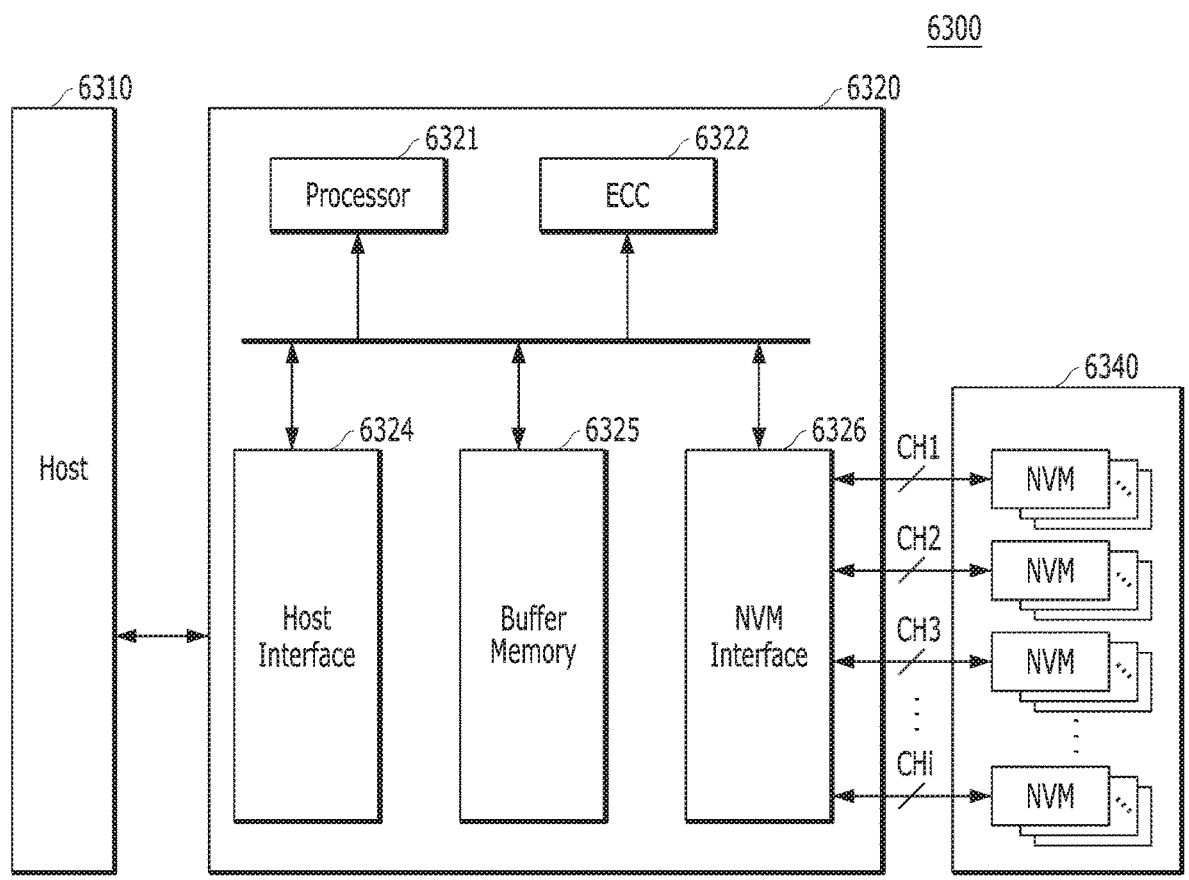

FIG. 11 is a diagram schematically illustrating another example of the data processing system including the memory system in accordance with an embodiment. For example, FIG. 11 schematically illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). For convenience of description, FIG. 10 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
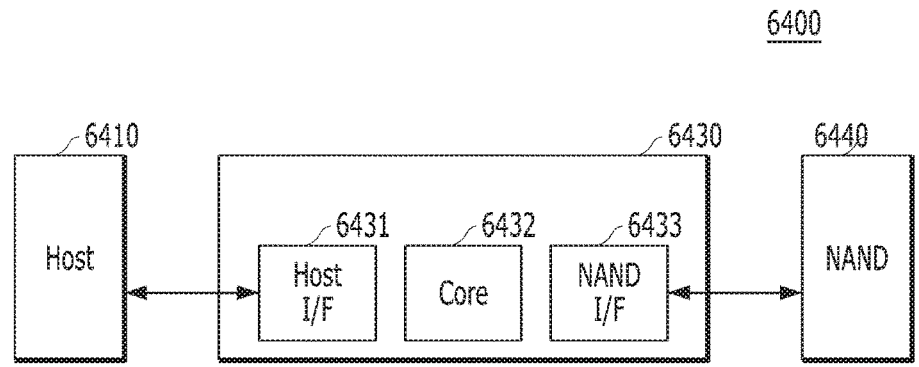

FIG. 12 is a diagram schematically illustrating another example of the data processing system including the memory system in accordance with an embodiment. For example, FIG. 12 schematically illustrates an embedded Multi-Media Card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

Each of the memory controller 6120, the memory controller 6220, the controller 6320 and the controller 6430, which have been described with reference to FIGS. 9 to 12, may determine a busy plane and an idle plane in response to the host command, and control the memory device such that the idle plane performs an operation of erasing a complete dirty block therein while the busy plane performs the host command operation.

FIGS. 13 to 16 are diagrams schematically illustrating other examples of the data processing system including the memory system in accordance with one or more embodiments. FIGS. 13 to 16 schematically illustrate universal flash storage (UFS) systems to which the memory system may be applied. The memory systems in accordance with the various embodiments described with reference to FIGS. 1 to 12 may be applied to the UFS which is described with reference to FIGS. 13 to 16.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices, particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 13:
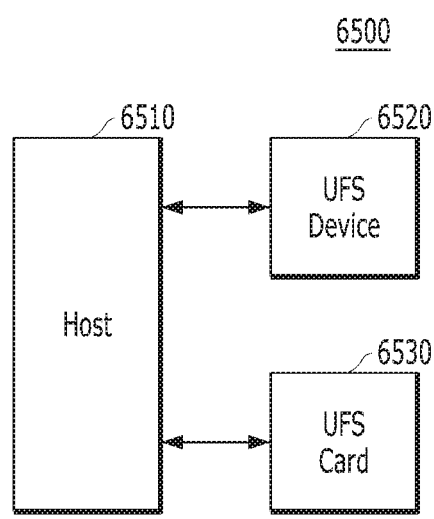

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 14:
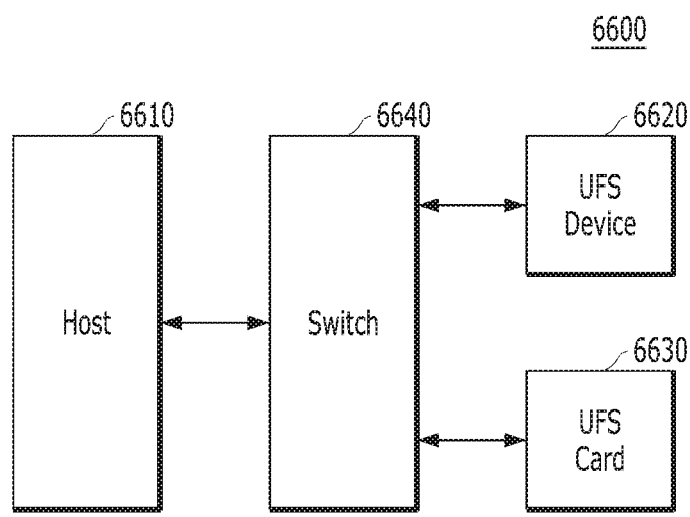

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
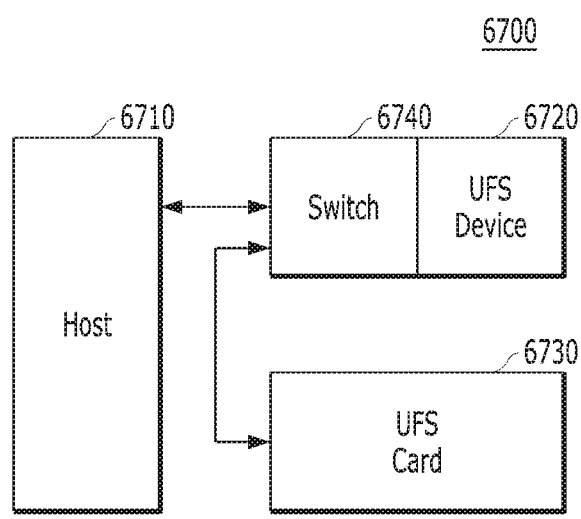

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
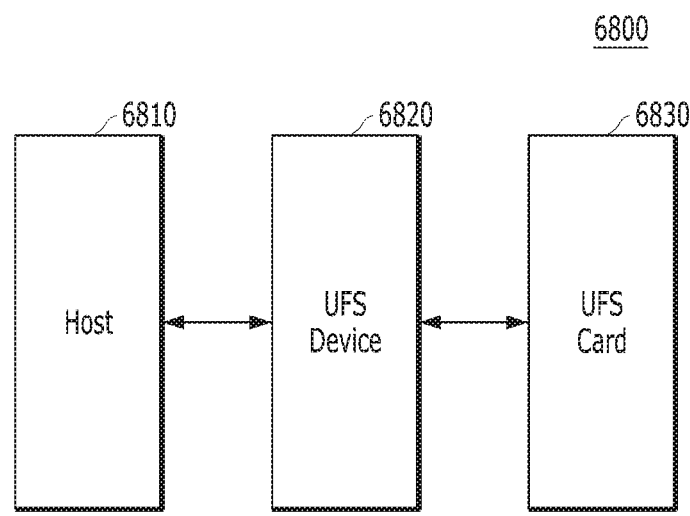

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
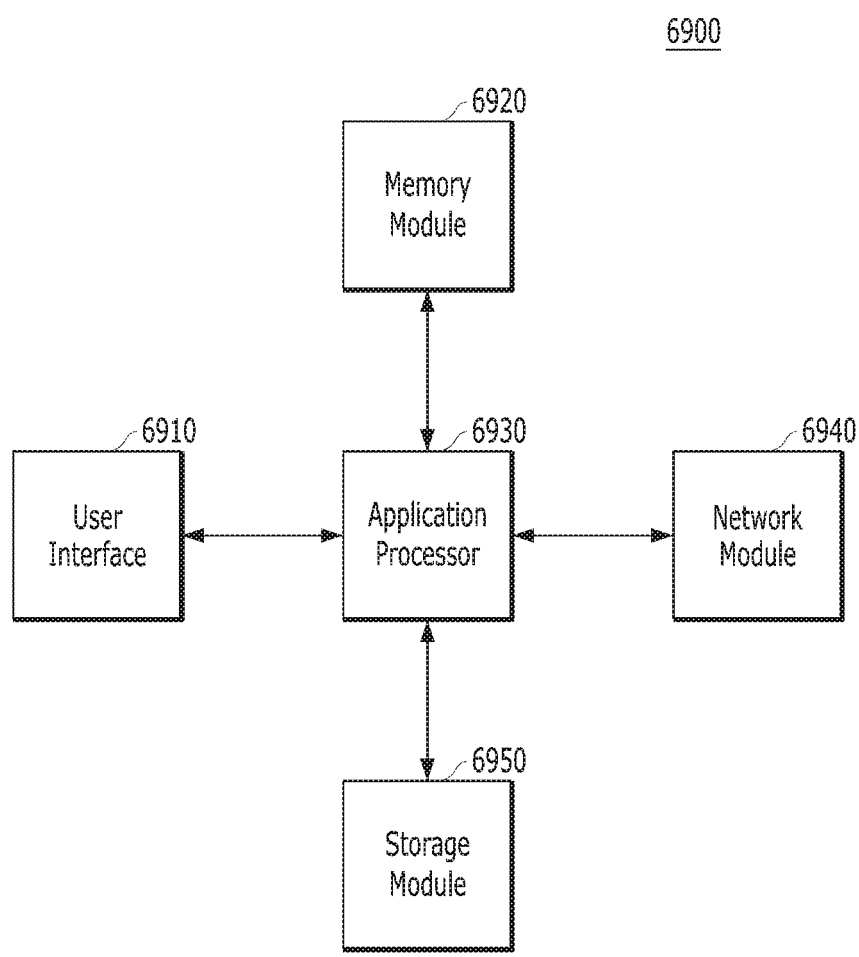

FIG. 17 is a diagram schematically illustrating another example of the data processing system including the memory system in accordance with an embodiment. For example, FIG. 17 is a diagram schematically illustrating a user system 6900 to which the memory system may be applied.

Referring to FIG. 17, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (W max), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

In an embodiment, in order to improve write performance, the storage module 6950 may determine a busy plane and an idle plane in response to the host command, and the idle plane may perform an operation of erasing a complete dirty block therein while the busy plane performs the host command operation.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device comprising a plurality of planes; and
a controller suitable for controlling the memory device,
wherein the controller comprises a processor suitable for determining at least one busy plane and at least one idle plane among the plurality of planes in response to a host command, and controlling the memory device such that the busy plane performs an operation associated with the host command and the idle plane performs an operation of erasing a complete dirty block in the idle plane,
wherein the busy plane and the idle plane operate in parallel in response to control of the processor.

2. The memory system of claim 1, wherein the processor further selects the complete dirty block to be erased.

3. The memory system of claim 2, wherein the processor determines whether dirty blocks are included in the idle plane, determines whether one or more dirty blocks without valid data are present among the dirty blocks, and selects the one or more dirty blocks without valid data as the complete dirty block to be erased.

4. The memory system of claim 3, wherein the controller further comprises a memory suitable for storing a superblock table indicating whether each memory block in each of a plurality of superblocks of the memory device is a free block,
  wherein the processor determines whether dirty blocks are present in the idle plane by referring to the superblock table.

5. The memory system of claim 4, wherein the memory further stores valid page counts of the respective memory blocks,
  wherein the processor determines whether there are complete dirty blocks, by referring to the valid page counts of the dirty blocks.

6. The memory system of claim 4, wherein, when the idle plane completes the operation of erasing the complete dirty block, the processor designates the complete dirty block as a free block in the superblock table.

7. The memory system of claim 1, wherein the processor determines, as the idle plane, at least one remaining plane of the plurality of planes excluding the busy plane.

8. The memory system of claim 4, wherein the processor retrieves a free superblock in the superblock table, depending on whether a superblock needs to be allocated in response to a write command as the host command, allocates the retrieved free superblock, and controls the memory device to perform the operation corresponding to the write command on the allocated free superblock.

9. The memory system of claim 8, wherein the processor retrieves a free superblock in the superblock table by determining whether the memory blocks constituting each of the superblocks are all free blocks.

10. The memory system of claim 8, wherein the processor designates memory blocks constituting the allocated free superblock as dirty blocks in the superblock table.

11. An operation method of a memory system which includes a memory device including a plurality of planes, the operation method comprising:
  determining at least one busy plane and at least one idle plane among the plurality of planes in response to a host command;
  performing, by the busy plane, an operation associated with the host command; and
  performing, by the idle plane, an erase operation on a complete dirty block,
  wherein the performing of the operation associated with the host command and the performing of the erase operation on the complete dirty block are performed in parallel.

12. The operation method of claim 11, further comprising selecting the complete dirty block to be erased.

13. The operation method of claim 12, wherein the selecting of the complete dirty block to be erased comprises:
  determining whether dirty blocks are included in the idle plane;
  determining whether one or more dirty blocks without valid data are present among the dirty blocks; and
  selecting the one or more dirty blocks without valid data as the complete dirty block to be erased.

14. The operation method of claim 13, wherein the determining of whether the dirty blocks are present in the idle plane is performed by referring to a superblock table indicating whether each memory block in each of a plurality of superblocks of the memory device is a free block.

15. The operation method of claim 14, wherein the determining of whether the one or more dirty blocks without valid data are present among the dirty blocks is performed by referring to valid page counts of the respective memory blocks.

16. The operation method of claim 14, further comprising designating the complete dirty block as a free block in the superblock table, when the erase operation on the complete dirty block is completed.

17. The operation method of claim 11, wherein the determining of the busy plane and the idle plane among the plurality of planes in response to the host command comprises determining, as the idle plane, at least one remaining plane of the plurality of planes excluding the busy plane.

18. The operation method of claim 14, further comprising:
  retrieving a free superblock in the superblock table, depending on whether a superblock needs to be allocated in response to a write command as the host command;
  allocating the retrieved free superblock; and
  controlling the memory device to perform the operation corresponding to the write command on the allocated free superblock.

19. The operation method of claim 18, further comprising designating memory blocks constituting the allocated free superblock as dirty blocks in the superblock table.

20. A memory system comprising:
  a memory device including a plurality of planes, which includes a plurality of blocks forming a superblock, each plane including a corresponding block among the plurality of blocks; and
  a controller suitable for:
    determining at least one plane associated with a command from a host, among the plurality of planes; and
    controlling the determined plane and at least one of remaining planes among the plurality of planes such that the determined plane performs an operation corresponding to the command, while the at least one of the remaining planes performs an operation of erasing a complete dirty block therein, the complete dirty block including invalid data.

* * * * *